United States Patent
Ohta

(10) Patent No.: US 8,272,788 B2
(45) Date of Patent: Sep. 25, 2012

(54) OPTICAL-PATH TURNING DEVICE

(75) Inventor: Tatsuya Ohta, Sakura (JP)

(73) Assignee: Fujikura Ltd., Tokyo (JP)

( * ) Notice: Subject to any disclaimer, the term of this patent is extended or adjusted under 35 U.S.C. 154(b) by 266 days.

(21) Appl. No.: 12/600,943

(22) PCT Filed: May 22, 2007

(86) PCT No.: PCT/JP2007/060403
§ 371 (c)(1),
(2), (4) Date: Nov. 19, 2009

(87) PCT Pub. No.: WO2008/142777
PCT Pub. Date: Nov. 27, 2008

(65) Prior Publication Data
US 2010/0158446 A1  Jun. 24, 2010

(51) Int. Cl.
*G02B 6/38* (2006.01)
*G02B 6/26* (2006.01)
*G02B 6/42* (2006.01)
(52) U.S. Cl. ............... 385/58; 385/32; 385/44; 385/45; 385/52; 385/89
(58) Field of Classification Search .............. 385/32, 385/44–46, 49, 50, 52, 58, 88–89
See application file for complete search history.

(56) References Cited

U.S. PATENT DOCUMENTS

| | | | |
|---|---|---|---|
| 4,496,215 A * | 1/1985 | Shaheen et al. ............... | 385/114 |
| 5,138,676 A | 8/1992 | Stowe et al. | |
| 5,452,393 A | 9/1995 | Stowe et al. | |
| 6,402,389 B1 | 6/2002 | Steijer et al. | |
| 6,422,761 B1 * | 7/2002 | Naghski et al. ............... | 385/73 |
| 6,496,624 B1 * | 12/2002 | Hikita et al. .................. | 385/50 |
| 6,934,450 B2 * | 8/2005 | Hiramatsu ..................... | 385/52 |
| 7,033,084 B2 * | 4/2006 | Lappohn ........................ | 385/73 |
| 7,300,216 B2 * | 11/2007 | Morse et al. .................. | 385/92 |
| 7,887,243 B2 * | 2/2011 | Abel et al. .................... | 385/73 |
| 2004/0208453 A1 | 10/2004 | Jacobowitz et al. | |
| 2006/0045418 A1 * | 3/2006 | Cho et al. ...................... | 385/31 |

FOREIGN PATENT DOCUMENTS

| | | |
|---|---|---|
| CN | 1217070 A | 5/1999 |
| JP | 01-293308 A | 11/1989 |
| JP | 02-015204 A | 1/1990 |
| JP | 02-033121 A | 2/1990 |

(Continued)

*Primary Examiner* — Daniel Petkovsek
(74) *Attorney, Agent, or Firm* — Sughrue Mion, PLLC

(57) ABSTRACT

An optical-path turning device is interposed between paired first and second optical components of pin-fitting alignment system that have their optical paths mutually different in direction, for an optic coupling between the optical components, and has a device body 16 of a block shape. The device body 16 includes a first connector portion 11 that has a set of fitting pinholes 11a oriented in correspondence to a set of fitting pinholes of the first optical component, and a connection end face 11b butt-connected with a connection end face of the first optical component, and a second connector portion 12 that has a set of fitting pinholes 12a oriented in correspondence to a set of fitting pinholes of the second optical component, and a connection end face 12b butt-connected with a connection end face of the second optical component, and further includes a set of optical fibers (as optical waveguides) 14 extending from the connection end face 11b of the first connector portion 11 through a flexural portion 14b to the connection end face 12b of the second connector portion 12.

8 Claims, 11 Drawing Sheets

FOREIGN PATENT DOCUMENTS

| | | |
|---|---|---|
| JP | 04-036708 A | 2/1992 |
| JP | 5-508033 A | 11/1993 |
| JP | 09-026525 A | 1/1997 |
| JP | 10-246827 A | 9/1998 |
| JP | 2000-509839 A | 8/2000 |
| JP | 2004-139041 A | 5/2004 |
| JP | 2004-191564 A | 7/2004 |
| WO | 97/42536 A1 | 11/1997 |

* cited by examiner

OPTICAL-PATH TURNING DEVICE

TECHNICAL FIELD

The present invention relates to an optical-path turning device to be interposed among optical components having mutually different optical paths, to implement an optic coupling among the optical components.

BACKGROUND ART

There are optic interconnections with a turned orientation of optical path between optical components encompassing optical connectors, optical fiber arrays, optical switches, etc, to which typical is the use of a method of providing a mirror or prism facing end faces of optical fibers to turn the optical path, as disclosed in the patent document 1 or 2 below.

There are also optical-path turning connectors including orthogonally arranged cores buried in resin claddings and ground at their intersections to form a mirror to turn the optical path, as disclosed in the patent document 3 below. In such a case, there is use of a halogenated glass as a cladding, combined with formation of a core with varied refractive indices by irradiation of laser light. Such the optical-path turning connectors are configured for applications of a pin-fitting system to alignments in paired orthogonal orientations being the orientation of an optical component and the orientation of a mating optical connector, and have a so-called MT connector structure as the interconnection structure in connector.

There are also optical-path turning appliances configured as still another type with a polymer-based flexible optical waveguide formed in substrate in the shape of an arc curved on the way from an input end face to an output end face, as they are orthogonally oriented, as disclosed in the patent document 4 below. In such a case, the polymer-based flexible optical waveguide is interposed between paired substrate sections made of an acrylic resin, for instance, as they are formed with curved convex and concave surfaces, respectively, to be bonded with a UV adhesion for manufacture. The substrate sections are provided with sets of fitting pins to be fit each in either of sets of fitting pinholes oriented in orthogonal two directions.

Patent document 1: Japanese Patent Application Laid-Open Publication No. 2-33121
Patent document 2: Japanese Patent Application Laid-Open Publication No. 9-26525
Patent document 3: Japanese Patent Application Laid-Open Publication No. 2004-191564
Patent document 4: Japanese Patent Application Laid-Open Publication No. 10-246827 (FIG. 5, FIG. 7)

DISCLOSURE OF THE INVENTION

For optic interconnections with a turned orientation of optical path such as those of optical connectors, optical fiber arrays, or optical switches, preferably the configuration of a respective entirety should be as compact as possible, and preferably the compact configuration should be implemented in a facilitated manner.

There is a pin-fitting alignment system wide-spread to use as a system for alignment with a mating end of connection such as those in optical connectors, the pin-fitting alignment system being employed for optical components in optic wiring routes that have optical paths to be turned, of which also it is in particular preferable to provide a system that permits the configuration of a respective entirety to be made compact in a simplified manner.

It however is difficult to implement a sufficient compactness by use of such a system that employs a prism, mirror, or like optic elements, as disclosed in the patent document 1 or 2.

To this point, using such a system that forms built-in mirrors as disclosed in the patent document 3 does implement compactness, subject to a complicate process of forming built-in mirrors, so it can hardly stand as a simplified system.

In this respect, compactness can be implemented by use of such a system that forms a polymer-based flexible optical waveguide in a substrate as disclosed in the patent document 4, which has not been matured yet to always go as a simplified general system.

The present invention has been devised in view of the foregoing issues, and it is an object thereof to provide an optical-path turning device configured to turn an optical path in an optic wiring route using optical components, allowing for an entire configuration thereof to be made compact in a simplified manner.

(Means for Solving the Object)

To achieve the object described, according to a first aspect of the present invention, an optical-path turning device is to be interposed among optical components having mutually different optical paths, for an optic coupling among the optical components, and comprises a device body of a block shape comprising a plurality of connection end faces to be connected with the optical components respectively, and a flexural portion interposed between paired connection end faces of the plurality of connection end faces, and a set of optical waveguide extending from one of the paired connection end faces to the other thereof and provided in the device body.

According to a second aspect of the present invention, an optical-path turning device is to be interposed between first and second optical components of pin-fitting alignment system having mutually different optical paths, for an optic coupling between the optical components, and comprises a device body of a block shape comprising a first connector portion having a connection end face to be butt-connected with a connection end face of the first optical component, a second connector portion having a connection end face to be butt-connected with a connection end face of the second optical component, and a flexural portion interposed between the first connector portion and the second connector portion, and a set of optical waveguide extending from the connection end face of the first connector portion through the flexural portion to the connection end face of the second connector portion and formed in the device body.

According to a third aspect of the present invention, an optical-path turning device is to be interposed between a combination of first and third optical components and a second optical component having a different optical path with respect to the optical components, being each respectively of pin-fitting alignment system, for an optic coupling between the combination of the first and third optical components and the second optical component, and comprises a device body of a block shape comprising a first connector portion having a connection end face to be butt-connected with a connection end face of the first optical component, a second connector portion having a connection end face to be butt-connected with a connection end face of the second optical component, a third connector portion having a connection end face to be butt-connected with a connection end face of the third optical component, and a flexural portion interposed among the first connector portion, the second connector portion, and the third connector portion, and a set of optical waveguides extending from a combination of the connection end face of the first connector portion and the connection end face of the third connector portion through the flexural portion to the connection end face of the second connector portion and formed in the device body.

According to a fourth aspect of the present invention, an optical-path turning device is to be interposed among optical components of pin-fitting alignment system having different optical paths, for an optic coupling among the optical components, and comprises a device body of a block shape comprising a set of connector portions corresponding to the optical components, the set of connector portions each comprising a set of fitting pinholes oriented in correspondence to a set of fitting pinholes of one of the optical components, and a connection end face to be butt-connected to a connection end face of the one of the optical components, and a flexural portion interposed among whole connector portions, and a set of optical waveguide extending from the connection end face of one connector portion through the flexural portion to the connection end face of another connector portion and formed in the device body.

BEST MODE FOR CARRYING OUT THE INVENTION

There will be described optical-path turning devices according to embodiments of the present invention, with reference to the drawings.

(Embodiment 1)

Figure 1:
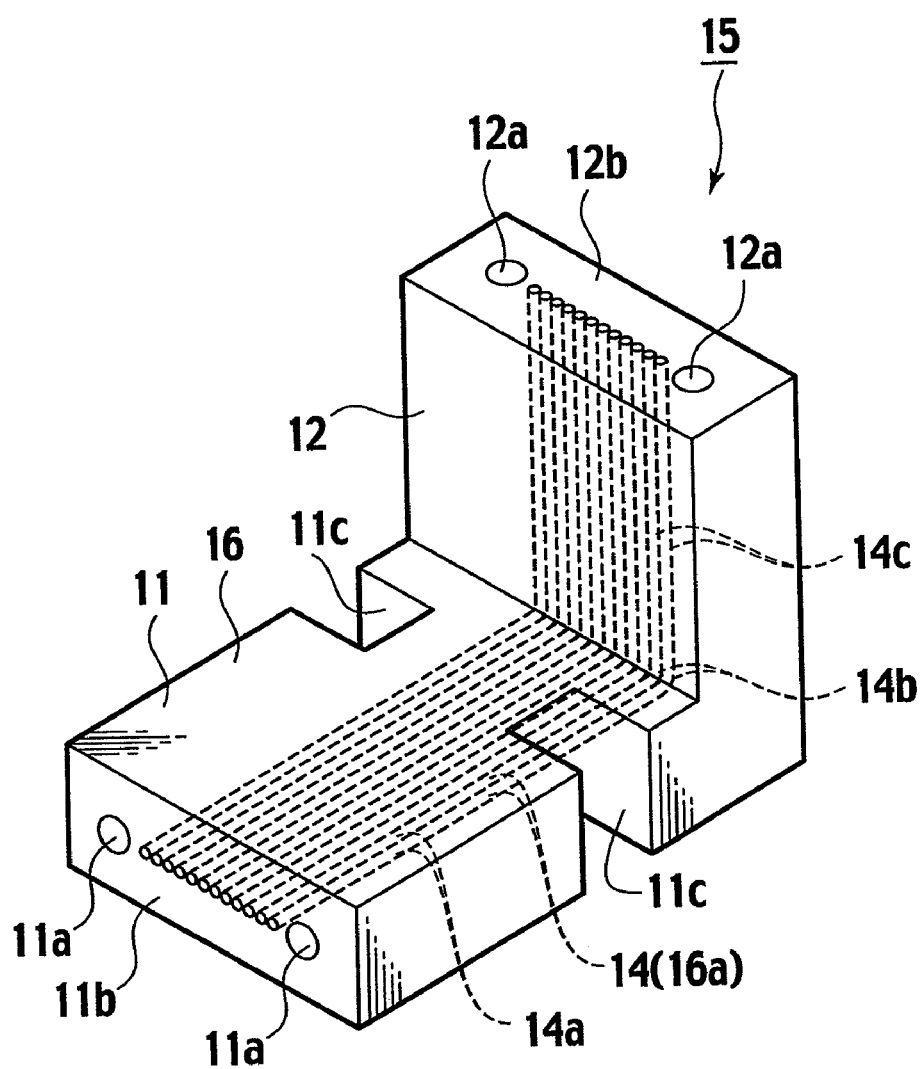
FIG. 1 is a perspective view of an optical-path turning device according to a first embodiment of the present invention.
Figure 2:
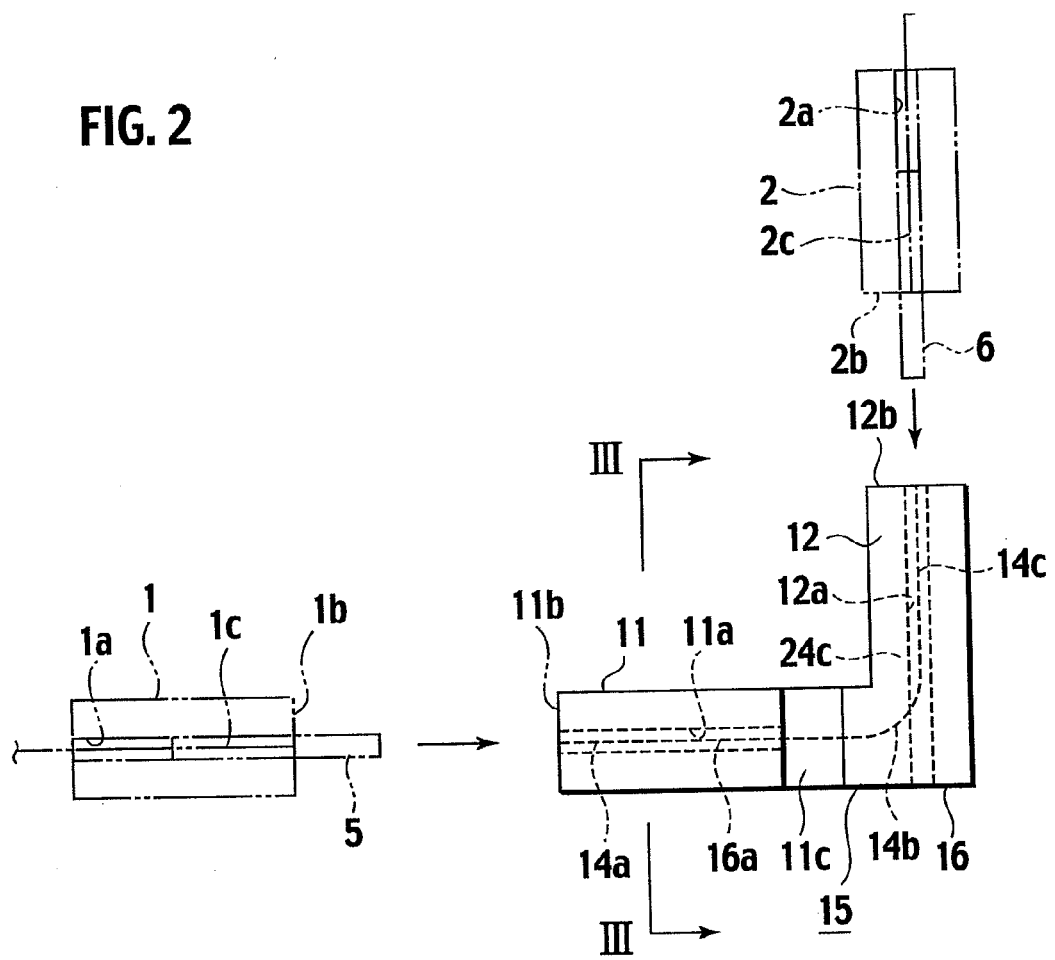
FIG. 2 is a side view for explanation of a procedure of using the optical-path turning device of FIG. 1 to make an optical-path turning optic coupling between a pair of optical components.
Figure 3:
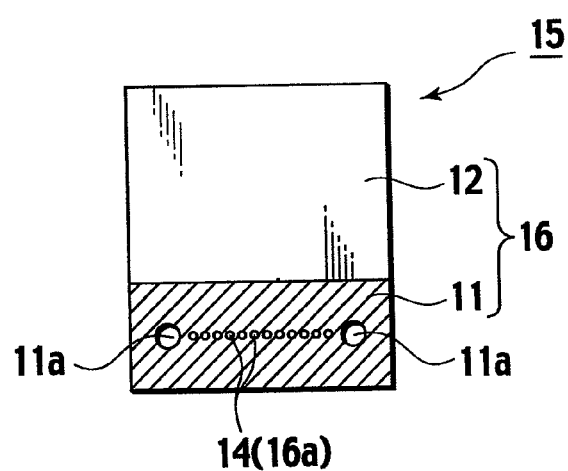
FIG. 3 is a III-III section of FIG. 2.

FIG. 1 is a perspective view of an optical-path turning device 15 according to a first embodiment of the present invention. FIG. 2 is a side view for explanation of a procedure of using the optical-path turning device 15 to make an optical-path turning optic coupling between a pair of optical components 1 and 2 of a pin-fitting alignment system that have their optical paths oriented at directions perpendicular to each other. FIG. 3 is a III-III section of FIG. 2.

It is noted that the pin-fitting alignment system is a known system having a set of fitting pins protruding from one of objects of an optical connection, and a set of fitting pinholes provided at the other of the optical connection objects, for receiving the fitting pins to establish positions of optical waveguide end faces of the optical connection objects to each other. As used herein, the fitting pins each mean an example of a fitting projection projecting from one of optical connection objects, and the fitting pinholes each mean an example of a fitting receiver formed at the other of the optical connection objects for receiving the fitting projection. In the following description of embodiments, the terms "fitting pin" and "fitting pinhole" will be used for descriptive purposes, while the invention is in no way restricted to those embodiments.

The optical-path turning device 15 has a device body 16 made of resin in the form of a block L-shaped in section. The device body 16 is provided with: a first connector portion 11 that has fitting pinholes 11a oriented in correspondence to fitting pinholes 1a of a first optical component 1, and a connection end face 11b to be butt-connected with a connection end face 1b of the first optical component 1; and a second connector portion 12 that has fitting pinholes 12a oriented in correspondence to fitting pinholes 2a of a second optical component 2, and a connection end face 12b to be butt-connected with a connection end face 2b of the second optical component 2. The first connector portion 11 and the second connector portion 12 are each made generally in the form of a thinnish rectangular parallelepiped, while the device body 16 is made in the form of a block L-shaped in section as described and configured for them 11 and 12 to be mated at right angles. It is noted that the first connector portion 11 has cutouts 11c formed therein for engagement with another member or other members to lock the optical-path turning device 15 thereto.

Although there are fitting pinholes formed to be straight over a span encompassing an optical component and part of the device body, for application of fitting pins to be set therein to bridge over, it also is invention-compliant to employ a system that has fitting pins protruded at either end to insert into fitting pinholes at the mating end.

There is a set of optical waveguides 14 extending from the connection end face 11b of the first connector portion 11 to the connection end face 12b of the second connector portion 12, to flex for a 90-degree turn of optical paths. Each optical waveguide 14 is straight in part at the side of the first connector portion 11, and in part at the side of the second connector portion 12, (forming straight parts denoted by 14a and 14c) respectively, and has a flexed part 14b at or near a butt portion between the first connector portion 11 and the second connector portion 12.

Each optical waveguide 14 is made up by an optical fiber hole 16a including a flexed part flexed at 90 degrees (i.e., a hole corresponding to a combination of 14a, 14b, and 14c) pierced in the device body 16, and an optical fiber inserted into the optical fiber hole 16a and fixed by adhesion.

The optical fiber used may well be such an optical fiber that is less bend-sensitive than a standard optical fiber, and would undergo a slower aging degradation even if it were left as it is bent. Using such a bend-insensitive optical fiber leads to implementing an optical-path turning device compact in size with a reduced bend radius. As used herein the standard optical fiber means a sort of quartz optical fiber generally employed for fiber-optic communications within a transmission wavelength range of 1,310 to 1,630 nm, and practically it means an optical fiber that has a minimum bend radius of 30 mm.

There may be use of a core-assisted fiber or photonic-crystal fiber, for instance.

The core-assisted fiber is an optical fiber of a structure with air holes formed around a core to confine light. The photonic-crystal fiber is an optical fiber in which, relative to the core-assisted fiber, air holes are still increased in number, so air holes are arranged in neat rows like a crystal lattice, constituting a photonic band gap, permitting the number, size, interval, array, or such of air holes to be devised for wide reduction of bend loss.

There may be employed an optical fiber using a polymer-based waveguide, as well.

Moreover, as a bend-insensitive optical fiber, there may also be use of a quartz-based optical fiber that has a smaller core diameter than a standard single-mode optical fiber, as represented by Future Guide SR-15 (Fujikura trademark and model number), for instance. This optical fiber can be defined as having a bending loss not exceeding 0.5 dB at a transmission wavelength of 1.55 μm, when curled ten turns to a diameter of 10 mm. To this point, there may also be used those optical fibers in which the distribution of refractive indices in optical fiber section is varied to still reduce the bend loss. As examples with a varied refraction index distribution, there are optical fibers in which the refractive index profile is made in a W form or trench form.

Yet more, there may be use of a PCF (plastic clad optical fiber) that has a plastic cover as a cladding around a quartz core.

The optical-path turning device 15 is embodied for a case in which the two optical components 1 and 2 to be optically interconnected by the optical-path turning device 15 are so-called MT connectors that generally correspond to an F12 multi-core optical fiber connector to the JIS C 5981, so it has substantially MT connector structures at or near the connection end faces 11b and 12b of the first connector portion 11 and the second connector portion 12.

Unless otherwise specified, embodiments of the present invention have commonly employed a pin-fitting precise alignment system using an MT connector, as a structure for aligned connection of optical connector.

In the optical-path turning device 15, for an optical-path turning optic coupling between first and second optical connectors (as the optical components) 1 and 2 of a pin-fitting alignment system that have their optical path directions perpendicular to each other as illustrated in FIG. 2, those fitting pins 5 fit in the fitting pinholes 1a of the first optical connector 1 are made to fit into the fitting pinholes 11a that the optical-path turning device 15 has at the end of the first optical connector portion 11, with an ensured mutual alignment between the first optical connector 1 and the first optical connector portion 11 of the optical-path turning device 15, and the two connection end faces 1b and 11b are butted to each other, with a set of established optical connections between optical fibers 1c in the first optical connector 1 and end faces of optical waveguides 14 that the optical-path turning device 15 has at the end of the first optical connector portion 11.

Likewise, those fitting pins 6 fit in the fitting pinholes 2a of the second optical connector 2 are made to fit into the fitting pinholes 12a that the optical-path turning device 15 has at the end of the second optical connector portion 12, with an ensured mutual alignment between the second optical connector 2 and the second optical connector portion 12 of the optical-path turning device 15, and the two connection end faces 2b and 12b are butted to each other, with a set of established optical connections between optical fibers 2c in the second optical connector 2 and end faces of optical waveguides 14 that the optical-path turning device 15 has at the end of the second optical connector portion 12.

The optical-path turning device 15 thus permits an optical-path turning optic coupling to be made between the first and second optical connectors (as optical components) 1 and 2 that have their optical path directions perpendicular to each other.

It is noted that there may be an adequate system employed as a connector connection system between the first optical connector 1 and the first optical connector portion 11 of the optical-path turning device 15, or between the second optical connector 2 and the second optical connector portion 12.

For instance, for the connection to be a PC connection, there may be use of an MPO optical connector structure permitting a maintained contact pressure between optical fibers. In such a case, though not specifically depicted, the first optical connector 1 may be an MPO optical connector plug accommodated in an MPO connector housing. The MPO optical connector is standardized in the JIS C 5982. Also the first optical connector portion 11 of the optical-path turning device 15 may be an MPO optical connector plug accommodated in an MPO connector housing.

Such MPO optical connector plugs may be aligned to each other by use of an unshown MPO adaptor, for connection between the first optical connector 1 and the first optical connector portion 11. Or alternatively, either plugging section may be attached to an MPO optical receptacle. This is a fixed structure that includes one MPO optical connector plug at the optical connector end, and one connector portion of the light-path turning device accommodated in the MPO optical receptacle. To this point, there may be an optical connector housing structure else than such the MPO optical connector structure, employed as a connector portion fixing structure.

It is noted that the optical-path directions may intersect each other at angles else than right angles. The number of cores connected between the optical-path turning device and an optical connector, that is, the number of optical fibers in between is not restricted to any plurality, and may well include the case of a single core.

The foregoing matters are common to the other embodiments of the present invention.

According to this embodiment, the optical-path turning device 15 is advantageous, when compared with those systems employing optical elements such as a mirror or prism like the patent document 1 or 2, in that it has ability to implement significant compactization, and implement a space saving in optical equipment.

Moreover, it can do with the device body 16 of a block shape resin-molded with the optical fiber holes 16a with their flexed parts inclusive, and a set of optical fibers (optical waveguides) 14 inserted into the optical fiber holes 16a and fixed by adhesion, thus allowing for a very easy and simple fabrication, in comparison with methods of forming a core set as a distribution of refractive indices varied by laser irradiation in a cladding material like the patent document 3. Still more, it has optical fibers 14 employed as flexed optical waveguides in the device body 16, and is general and simplified in comparison with those systems in which polymer-based flexible optical waveguides are formed in a substrate like the patent document 4.

Yet more, it is configured with pin-fitting alignment systems adapted for connector connections at both sides (the first connector portion 11 and the second connector portion 12), so it is applicable to optic wiring lines using very general MT connectors, and has broad utility and high utility value.

(Second Embodiment)

Figure 4:
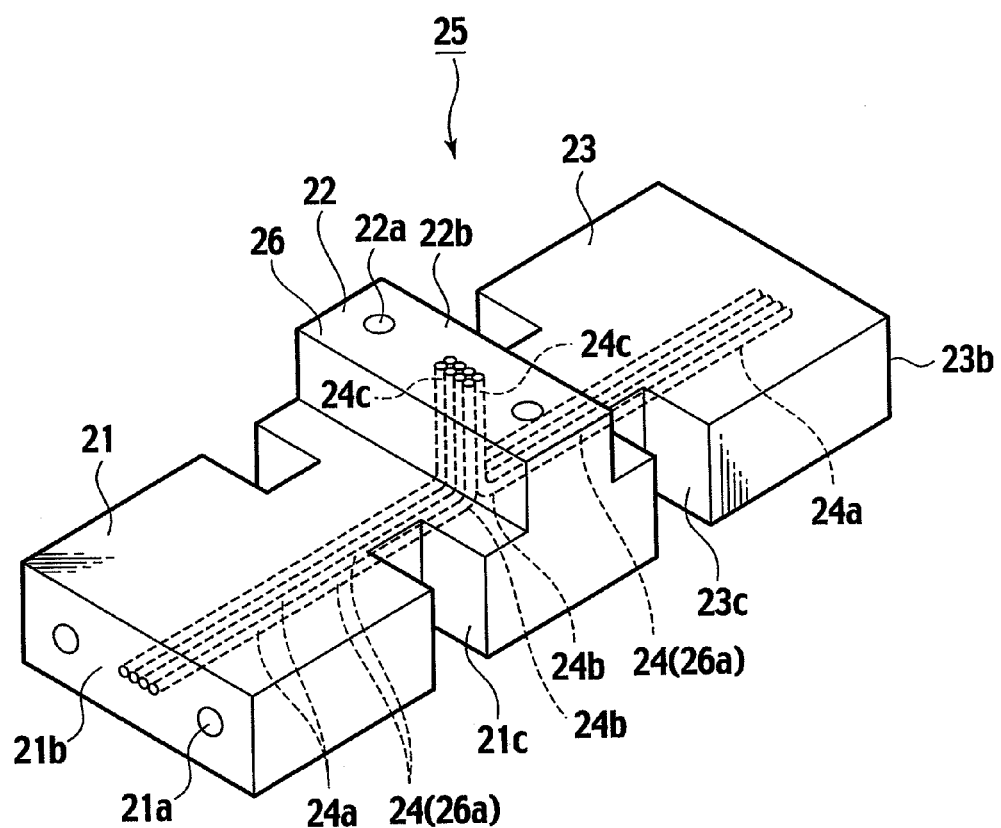
FIG. 4 is a perspective view of an optical-path turning device according to a second embodiment of the present invention.
Figure 5:
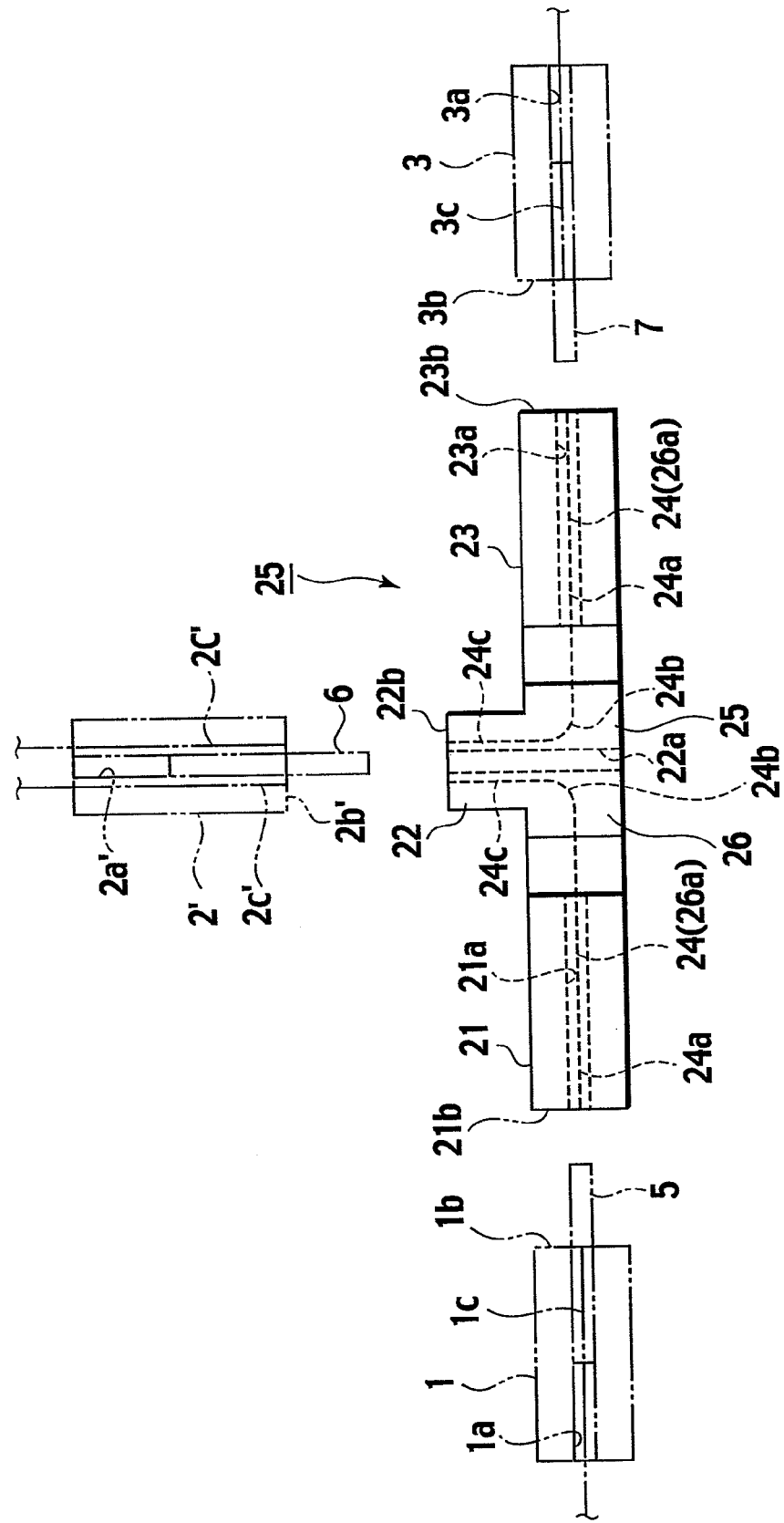
FIG. 5 is a side view of the optical-path turning device of FIG. 4.

FIG. 4 and FIG. 5 illustrate an optical-path turning device 25 according to the second embodiment. The optical-path turning device 25 is interposed between a combination of a first optical component 1 and a third optical component 3 and a second optical component 2' having a different direction of optical path with respect to the two optical components 1 and 3, each respectively being of pin-fitting alignment system, for an optic coupling between the combination of the first and third optical components 1 and 3 and the second optical component.

The optical-path turning device 25 has a device body 26 shaped like a block in the form of an inverted short T in section including a second connector portion 22 as a central convex portion.

The device body 26 is provided with: a first connector portion 21 that has fitting pinholes 21a oriented in correspondence to fitting pinholes 1a of the first optical component 1, and a connection end face 21b to be butt-connected with a connection end face 1b of the first optical component 1; a third connector portion 23 that has fitting pinholes 23a oriented in correspondence to fitting pinholes 3a of the third optical component 3, and a connection end face 23b to be butt-connected with a connection end face 3b of the third optical component 3; the second connector portion 22 that has fitting pinholes 22a oriented in correspondence to fitting pinholes 2a' of the second optical component 2', and a connection end face 22b to be butt-connected with a connection end face 2b' of the second optical component 2'; and sets of bend-insensitive optical fibers (as optical waveguides) 24 extending from the connection end face 21b of the first connector portion 21 and the connection end face 23b of the third connector portion 23, respectively, through a flexural portion 24b, to the connection end face 22b of the second connector portion 22. In both of the sets, optical fibers 24 have their straight parts denoted by 24a and 24c. The optical fibers 24 are each inserted into an optical fiber hole denoted by 26a.

The second optical component 2' is not a simple MT connector that simply has a single transverse array of optical fibers, but a multi-core connector of a two-dimensional array in which an optical fiber arrays is doubled.

According to this embodiment, the optical-path turning device 25 has a preferred application to a situation in which the second optical component 2' is connected to a repeater.

(Third Embodiment)

Figure 6:
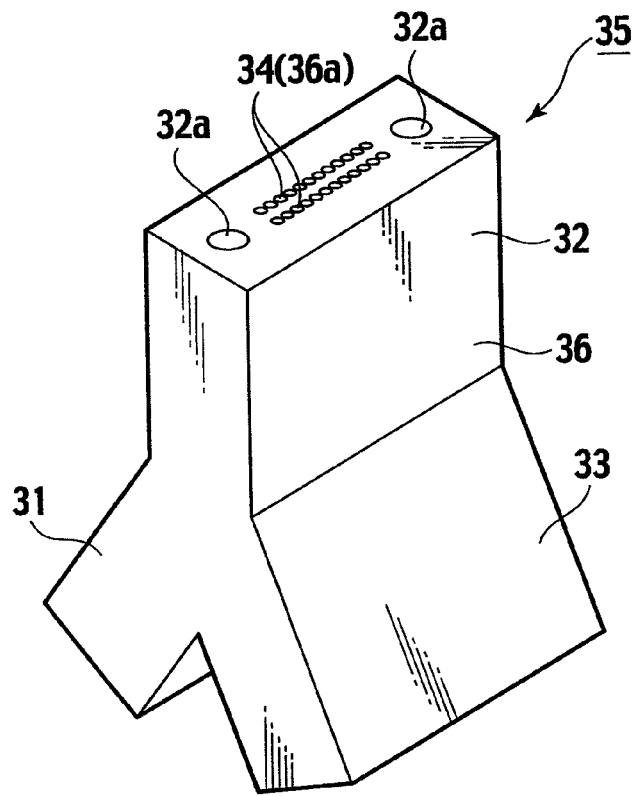
FIG. 6 is a perspective view of an optical-path turning device according to a third embodiment of the present invention.
Figure 7:
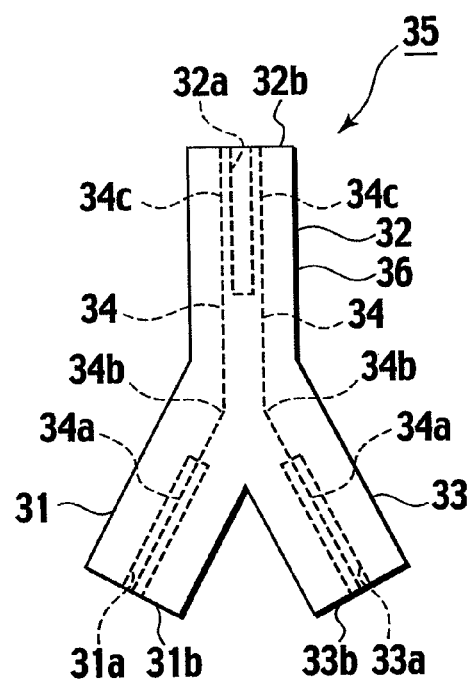
FIG. 7 is a side view of the optical-path turning device of FIG. 6.
Figure 8:
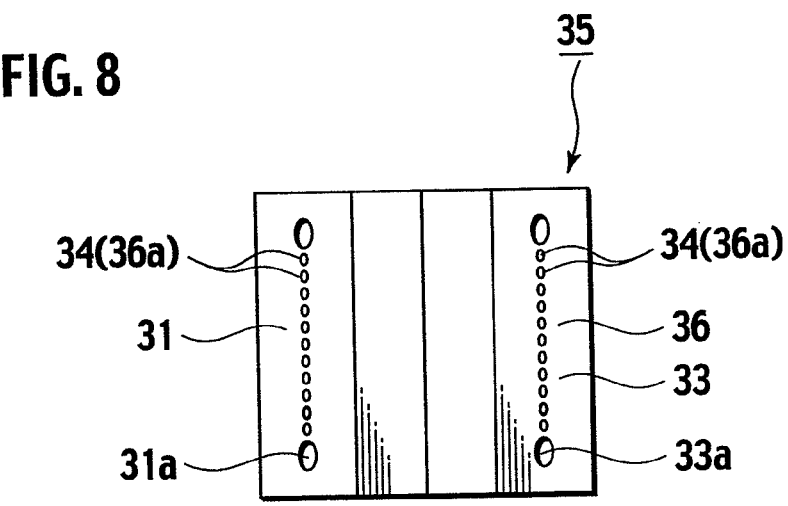
FIG. 8 is a bottom view of FIG. 7.

FIG. 6 to FIG. 8 are illustrations of an optical-path turning device 35 according to the third embodiment. The optical-path turning device 35 has a device body 36 shaped in a Y-form in section, including a first connector portion 31 and a third connector portion 33 bifurcated from a second connector portion 32.

The device body 36 is provided with: the first connector portion 31 that has fitting pinholes 31a oriented in correspondence to fitting pinholes of a first optical component (not shown), and a connection end face 31b to be butt-connected with a connection end face of the first optical component; the third connector portion 33 that has fitting pinholes 33a oriented in correspondence to fitting pinholes of a third optical component (not shown), and a connection end face 33b to be butt-connected with a connection end face of the third optical component; the second connector portion 32 that has fitting pinholes 32a oriented in correspondence to fitting pinholes of a second optical component, and a connection end face 32b to be butt-connected with a connection end face of the second optical component; and sets of bend-insensitive optical fibers (as optical waveguides) 34 extending from the connection end face 31b of the first connector portion 31 and the connection end face 33b of the third connector portion 33, respectively, through a flexural portion 34b, to the connection end face 32b of the second connector portion 32. In both of the sets, optical fibers 34 have their straight parts denoted by 34a and 34c. The optical fibers 34 are each inserted into an optical fiber hole denoted by 36a.

(Fourth Embodiment)

Figure 9:
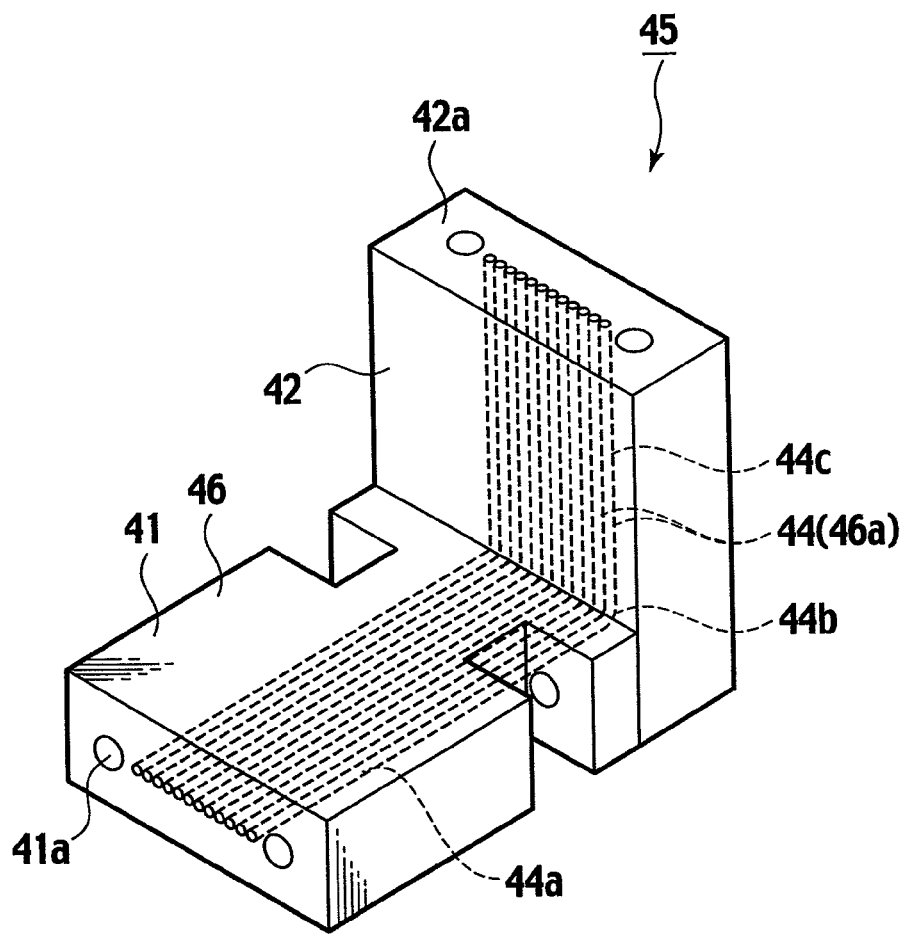
FIG. 9 is a perspective view of an optical-path turning device according to a fourth embodiment of the present invention.

FIG. 9 is a perspective view of an optical-path turning device 45 according to the fourth embodiment. The optical-path turning device 45 is a modification of the optical-path turning device 15 in FIG. 1, in which the first connector portion 11 and the second connector portion 12 of the device body 16 are fabricated separately and joined together. In other words, the optical-path turning device 45 has a device body 46 configured with a first connector portion 41 and a second connector portion 42 fabricated separately, the two 41 and 42 being joined together by an adhesive, for instance. Denoted by 41a and 42a are fitting-pin holes, 46a are optical fiber holes, and 44 are bend-insensitive optical fibers (as optical waveguides) inserted and fixed in the optical fiber holes 46a.

In this configuration, the first connector portion 41 has a set of plain straight optical fibers as elements therein free of flexed parts 44b. Optical fibers 44 have their straight parts denoted by 44a and 44c.

According to this embodiment, the optical-path turning device 45 has a divided configuration allowing for a facilitated fabrication.

(Fifth Embodiment)

Figure 10:
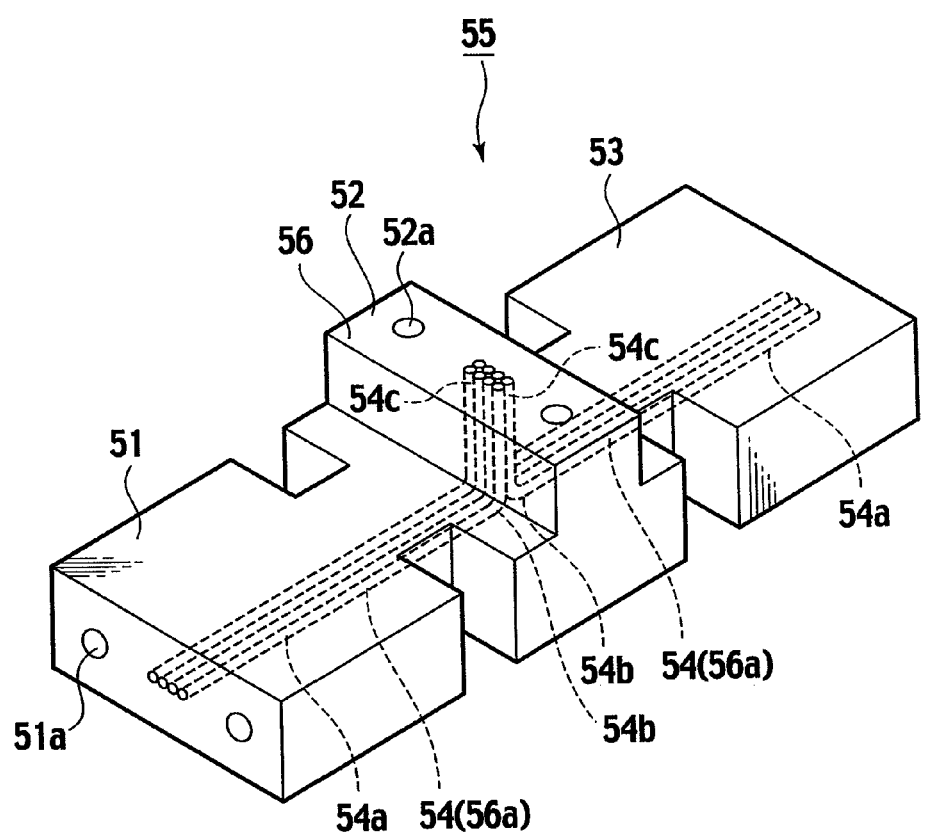
FIG. 10 is a perspective view of an optical-path turning device according to a fifth embodiment of the present invention.

FIG. 10 is a perspective view of an optical-path turning device 55 according to the fifth embodiment. The optical-path turning device 55 is a modification of the optical-path turning device 25 in FIG. 4, in which the first connector portion 21, the second connector portion 22, and the third connector portion 23 of the device body 26 are fabricated separately and joined together. In other words, the optical-path turning device 55 has a device body 66 configured with a first connector portion 51, a second connector portion 52, and a third connector portion 53 fabricated separately, the first connector portion 51 and the third connector portion 53 being joined to the second connector portion 52 by an adhesive, for instance. Denoted by 51a, 52a, and 53a (53a being not shown in the figure) are fitting-pin holes, 56a are optical fiber holes, and 54 are bend-insensitive optical fibers (as optical waveguides) inserted and fixed in the optical fiber holes 56a.

In this configuration, the first connector portion 51 and the third connector portion 53 have sets of plain straight optical fibers as elements therein free of flexed parts 54b. Optical fibers 54 have their straight parts denoted by 54a and 54c.

According to this embodiment also, the optical-path turning device 55 has a divided configuration allowing for a facilitated fabrication.

(Sixth Embodiment)

Figure 11:
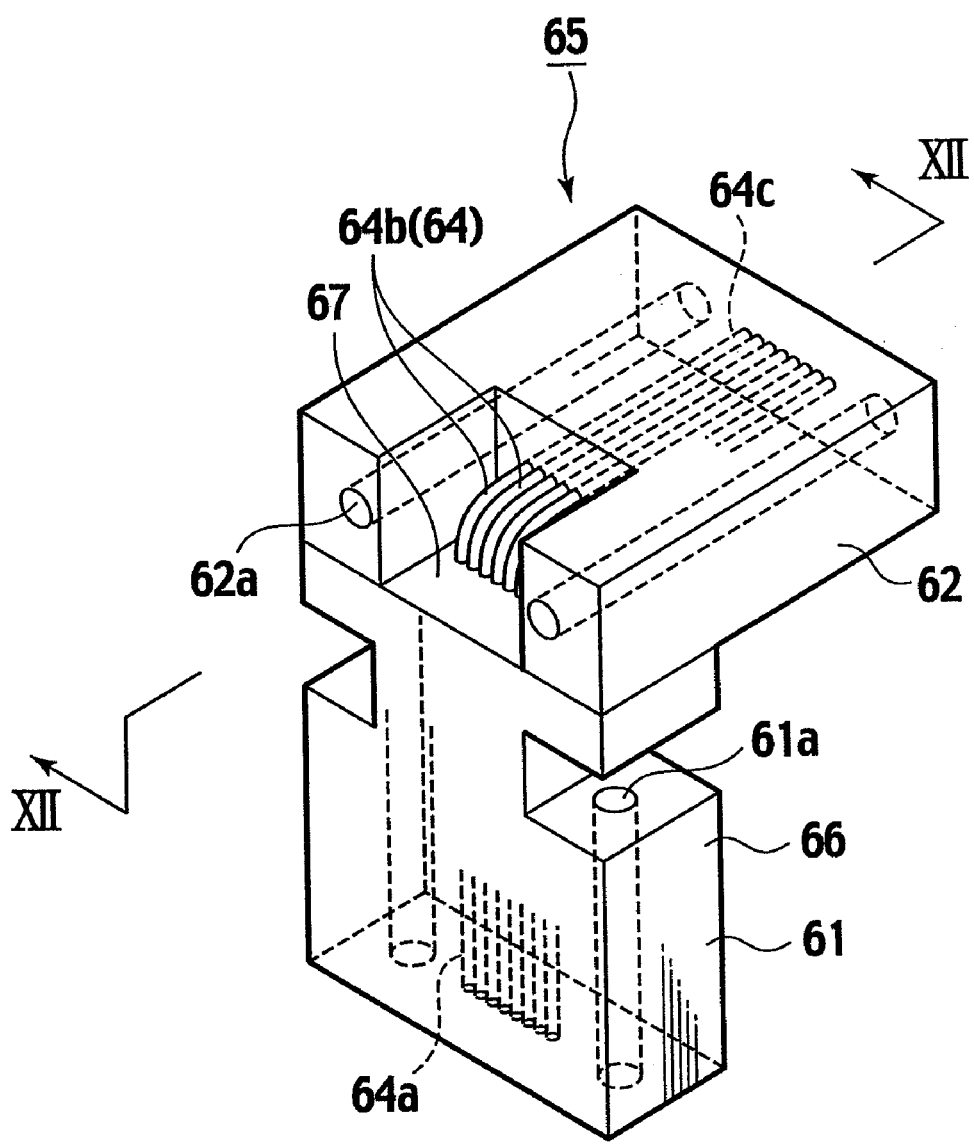
FIG. 11 is a perspective view of an optical-path turning device according to a sixth embodiment of the present invention.
Figure 12:
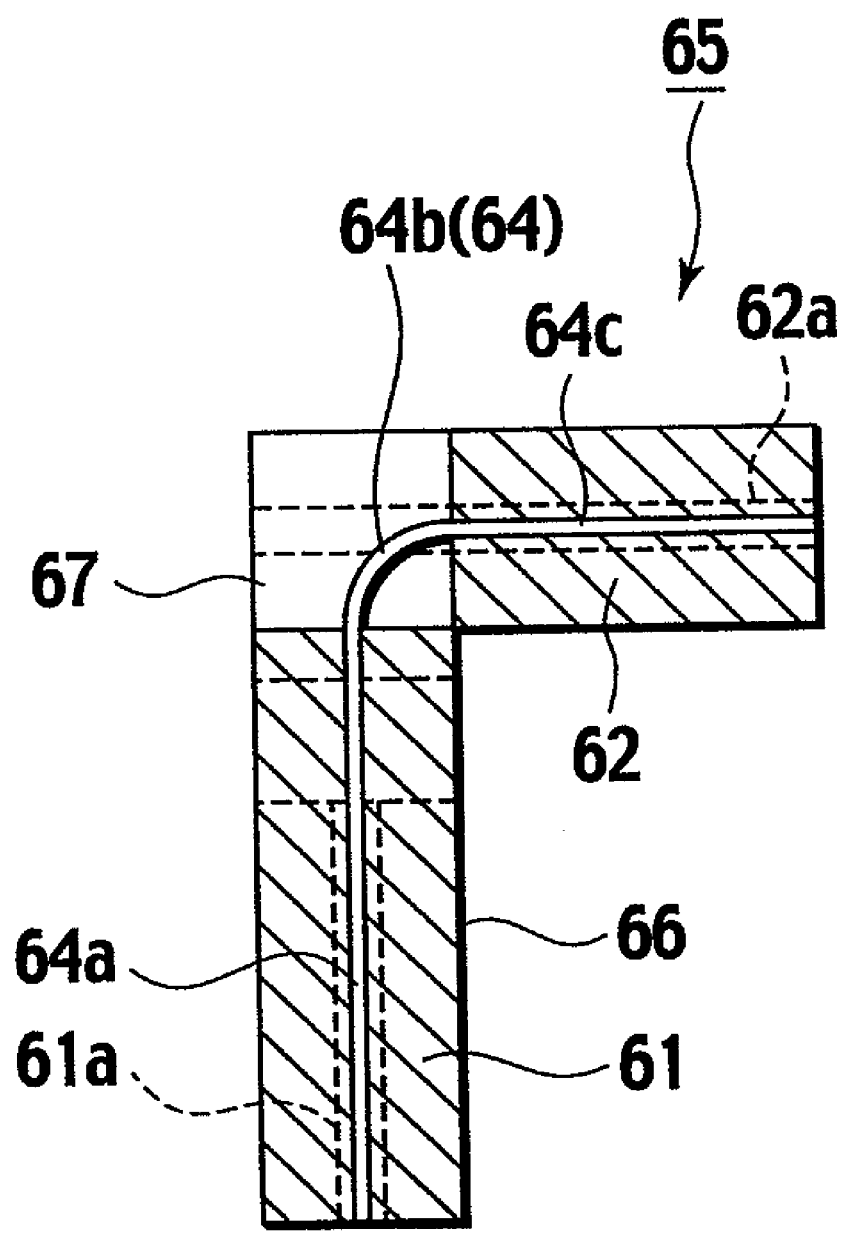
FIG. 12 is a XII-XII section of the optical-path turning device of FIG. 11.

FIG. 11 and FIG. 12 are illustrations of an optical-path turning device 65 according to the sixth embodiment. The optical-path turning device 65 is a modification of the optical-path turning device 45 in FIG. 9, including a recess formed in an outside part of a butted portion between the first connector portion 41 and the second connector portion 42, so optical fibers (optical waveguides) 44 in the device body 46 have flexed parts 44b exposed at the recess. In other words, the optical-path turning device 65 has a configuration including a recess 67 formed in an outside part of a butted portion between a first connector portion 61 and a second connector portion 62, and a set of optical fibers (optical waveguides) 64 installed in a device body 66, with flexed parts 64b thereof exposed at the recess 67. The recess 67 is formed as a cutout at the end of the second connector portion 62. Denoted by 61a are fitting-pin holes in the first connector portion 61, and 62a are fitting-pin holes in the second connector portion 62.

According to this embodiment, optical fibers are exposed at the recess 67, thus allowing for an increased facility for optical fibers to be inserted in a flexed state.

It is noted that between first connector portion 61 and second connector portion 62, the butted portion may have well a recess formed in an inside part thereof. That is, it can do with a recess for exposure in a region where optical fibers are flexed, whether the recess is formed inside or outside. Such a configuration may well be applied to other embodiments of the present invention.

(Seventh Embodiment)

Figure 13:
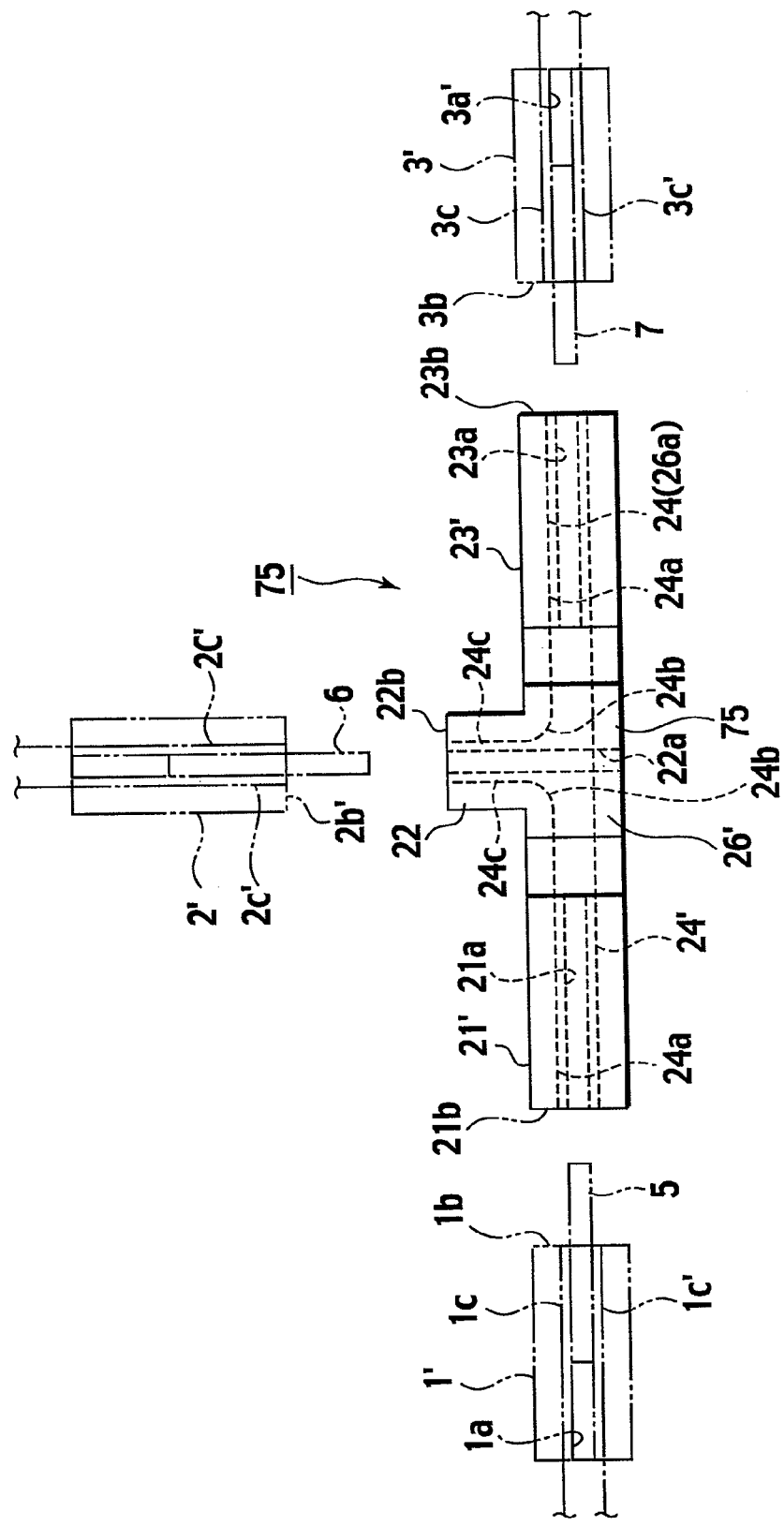
FIG. 13 is a side view for explanation of a procedure of using an optical-path turning device according to a seventh embodiment of the present invention to make an optical-path turning optic coupling among a triple of optical components.

FIG. 13 illustrates an optical-path turning device 75 according to the seventh embodiment. The optical-path turning device 75 is a modification of the optical-path turning device 25 in FIG. 4 and FIG. 5, in which the device body 26 is formed to have an additional set of optical fibers (optical waveguides) extending from the connection end face 21b of the first connector portion 21 to the connection end face 23b of the third connector portion 23. In other words, the optical-path turning device 75 has a device body 26' configured with an additional set of optical fibers (optical waveguides) 24' extending from a connection end face 21b of a first connector portion 21' to a connection end face 23b of a third connector portion 23'. The first connector portion 21' as well as the third connector portion the 23' has a two-dimensional array of optical fibers.

The optical-path turning device 75 has a second connector portion 22 identical to that in FIG. 4 and FIG. 5. Also for others, relative to FIG. 4 and FIG. 5, like parts are designated by like reference characters, omitting redundancy.

The optical-path turning device 75 is connected at the first connector portion 21' and the third connector portion 23' respectively with a first optical connector (optical component) 1' and a third optical connector (optical component) 3', each of which has a two-dimensional array of optical fibers. That is, the first optical connector (optical component) 1' has sets of optical fibers 1c and 1c' arranged in two arrays, and also the third optical connector (optical component) 3' has sets of optical fibers 3c and 3c' arranged in two arrays.

According to this embodiment, the optical-path turning device 75 has a preferred application including an optic wiring for direct interconnection free of flexion from the first optical connector 1' to the third optical connector 3'.

(Eighth Embodiment)

Figure 14:
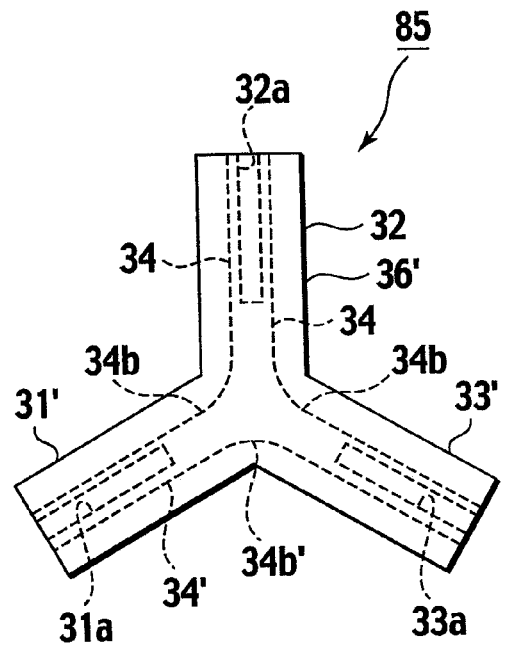
FIG. 14 is a side view of an optical-path turning device according to an eighth embodiment of the present invention.

FIG. 14 illustrates an optical-path turning device 85 according to the eighth embodiment. The optical-path turning device 85 is a modification of the optical-path turning device 35 in FIG. 6 to FIG. 8, in which the three connector portions 31, 32, and 33 constituting the device body 36 Y-shaped in section are equi-angularly spaced at 120 degrees, for provision of an additional set of optical fibers (optical waveguides) 34' extending from the first connector portion 31 to the third connector portion 33. In other words, the optical-path turning device 85 has a device body 36' in a Y-shape in section composed of three connector portions being a first connector portion 31', a second connector portion 32, and a third connector portion 33' equi-angularly spaced at 120 degrees, and is configured with an additional set of optical fibers (optical waveguides) 34' extending from the first connector portion 31' to the third connector portion 33'. In this embodiment, the first connector portion 31' and the third connector portion 33' each have a two-dimensional array of optical fibers, and are respectively connected with optical connectors, which connectors each have a two-dimensional array of optical fibers.

The optical-path turning device 85 has the second connector portion 32 identical to that in FIG. 6 to FIG. 8. Also for others, relative to FIG. 6 to FIG. 8, like parts are designated by like reference characters, omitting redundancy.

(Ninth Embodiment)

Figure 15:
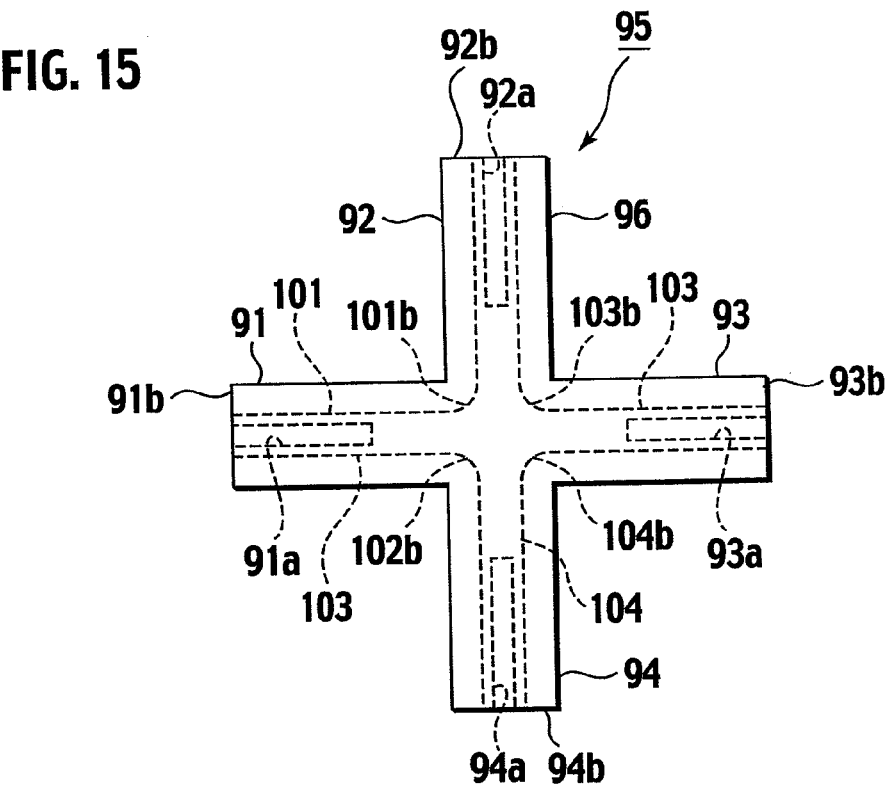
FIG. 15 is a side view of an optical-path turning device according to a ninth embodiment of the present invention.

The foregoing embodiments are each configured with two connector portions or three connector portions, while they may be configured with four or more connector portions. That is, the present invention is applicable to an optical-path turning device to be interposed among optical components of pin-fitting alignment system, as a set of which at least a subset includes optical components mutually different in optical path direction, to implement an optic coupling among the optical components, as in FIG. 15 illustrating an optical-path turning device 95 according to the ninth embodiment.

In this embodiment, the optical-path turning device 95 has a device body 96 in the form of a cross-shaped block, composed of four connector portions being a first connector portion 91, a second connector portion 92, a third connector portion 93, and a fourth connector portion 94. The connector portions 91, 92, 93, and 94 are each provided with sets of fitting pinholes 91a, 92a, 93a, and 94a, respectively, and have optical fibers extending from a connection end face 91b of the first connector portion 91 as a combination of a set of optical fibers 101 extended to a connection end face 92b of the second connector portion 92 and a set of optical fibers 102 extended to a connection end face 94b of the fourth connector portion 94, and from a connection end face 93b of the third connector portion 93 as a combination of a set of optical fibers 103 extended to the connection end face 92b of the second connector portion 92 and a set of optical fibers 104 extended to the connection end face 94b of the fourth connector portion 94. Those sets of optical fibers 101, 102, 103, and 104 have flexed parts denoted by 101b, 102b, 103b, and 104b, respectively.

(Tenth Embodiment)

Although in the foregoing embodiment each optical waveguide is composed of an optical fiber, it is in no way restricted to optical fiber, so there may be an optical waveguide comprising a core formed with a flexed part flexed at 90 degrees in a region of device body as a cladding, by a method similar to the method illustrated in FIG. 8 of the patent document 3, that is, the method of laser-irradiating a region of device body using a halogenated glass, for instance, to form the core as a varied distribution of refractive indices.

There may be a method employed to have a polymer-based flexible optical waveguide sandwiched between a pair of substrate sections made of an acrylic resin, for instance, and formed with curved concave side and convex side, respectively, and fixed by a UV adhesive, as illustrated in FIG. 1 of the patent document 2. There may be any method else employed as necessary.

Further, although in the embodiments each connector portion has an optical connector as a mating optical component, the optical component at the mating end of connection is in no way restricted to optical connector, so this may be substituted with various optical components encompassing an optical fiber array of a pin-fitting alignment system, an optical switch of a pin-sliding system, and the like.

Further, optical fibers inserted in optical fiber holes may each be, if quartz-based, a resin-coated one, or a bare fiber. Or alternatively, it may be such one that is resin-coated as necessary.

The foregoing embodiments have described a system using pins as means for precise alignment between optical component and optical connector portion. It however is noted that, as alignment systems for connection such as those in optical connectors are not limited to alignment systems using pins, in the present invention either, alignment systems at connector portions are not restricted to pin-fitting alignment systems. Use of pin-fitting alignment system is selective, as necessary.

For instance, there may be use of an adhesive for fixing. That is, the connection by pin-fitting alignment system may be applied to at least one of optical connector portions, or to none of connector portions.

INDUSTRIAL APPLICABILITY

According to the present invention, it is possible to provide an optical-path turning device advantageous, when compared with those systems employing optical components such as a mirror or prism like the patent document 1 or 2, in that it has ability to implement significant compactization, and implement a space saving in optical equipment.

Moreover, for use of optical fibers as optical waveguides flexed in a device body, it can do with the device body of block shape as resin-molded with optical fiber holes with flexed parts inclusive, and a set of bend-insensitive optical fibers inserted into the optical fiber holes and fixed by adhesion, thus allowing for a very easy and simple fabrication, in comparison with methods of forming a core as a distribution of refractive indices varied by laser irradiation in a cladding material like the patent document 3.

Further, it is more general and simple, in comparison with a system that forms polymer-based flexible optical waveguides in a substrate like the patent document 4.

Still more, each connector portion that has a set of fitting pinholes permits use of a pin-fitting alignment system for connection to be aligned with a mating end, thus allowing for a facilitated technique in connection with an optical component at the mating end.

Yet more, possible implementation of a connector connection of pin-fitting alignment system enables application to optic wiring lines using very general MT connectors, with broad utility and high utility value.

The invention claimed is:

1. An optical-path turning device to be interposed between first and second optical components of pin-fitting alignment system having mutually different optical paths, for an optic coupling between the optical components, the optical-path turning device comprising:
    a device body of a block shape made of resin comprising;
    a first connector portion provided with fitting pinholes facing to fitting pinholes of the first optical component, respectively, and having a connection end face to be butt-connected with a connection end face of the first optical component;
    a second connector portion provided with fitting pinholes facing to fitting pinholes of the second optical component, respectively, and having a connection end face to be butt-connected with a connection end face of the second optical component; and
    a set of optical waveguide extending from the connection end face of the first connector portion to the connection end face of the second connector portion through a flexural portion, wherein
    the first connector portion is provided with cutouts at both sides in a width direction thereof;
    the respective fitting pinholes of the first optical component are through holes passing from the connection end surface to the respective cutouts;
    the respective fitting pinholes of the second optical component are through holes passing over a whole length of the second optical component in a longitudinal direction thereof; and
    the first and second connector portions are detachable to the first and second optical components, respectively.

2. The optical-path turning device according to claim 1, wherein the set of optical waveguide is a set of optical fibers, and flexural portions of the set of optical fibers are exposed on an outside from a recess formed in an outside part of a butted portion between the first and second connector portions.

3. The optical-path turning device according to claim 1, wherein the first and second connector portions are separately formed, and jointed together in a butted portion between the first and the second connector portions to construct the device body.

4. The optical-path turning device according to claim 1, wherein the flexural portion has a 90 degree angle between the set of optical waveguide of the first connector portion and the set of optical waveguide of the second connector portion.

5. An optical-path turning device to be interposed between a combination of first and third optical components and a second optical component having a different optical path with respect to the first and third optical components, each respectively being of pin-fitting alignment system, for an optic coupling between the combination of the first and third optical components and the second optical component, the optical-path turning device comprising:
    a device body of a block shape made of resin comprising:
    a first connector portion provided with fitting pinholes facing to fitting pinholes of the first optical component, respectively, and having a connection end face to be butt-connected with a connection end face of the first optical component;
    a second connector portion provided with fitting pinholes facing to fitting pinholes of the second optical component, respectively, and having a connection end face to be butt-connected with a connection end face of the second optical component;
    a third connector portion provided with fitting pinholes facing to fitting pinholes of the third optical component respectively, and having a connection end face to be butt-connected with a connection end face of the third optical component; and
    a set of optical waveguides extending from a combination of the connection end face of the first connector portion and the connection end face of the third connector portion to the connection end face of the second connector portion through a flexural portion, wherein
    the first and third connector portions are provided touts at both side in a width direction thereof respectively;
    the respective fitting pinholes of the first optical component are through holes passing from the connection end surface to the respective cutouts;
    the respective fitting pinholes of the second optical component are through holes passing over a whole length of the second optical component in a longitudinal direction thereof;
    the respective fitting pinholes of the third optical components are through holes passing from the connection end surface to the respective cutouts; and the first, second and third connector portions are detachable to the first, second and third optical components, respectively.

6. The optical-path turning device according to claim 5, wherein the device body is Y-shaped in profile to have a combination of the first connector portion and the third connector portion bifurcated from the second connector portion.

7. The optical-path turning device according to claim 5, wherein the device body comprises a combination of the first connector portion, the second connector portion, and the third connector portion fabricated separately, the first connector portion and the third connector portion being joined to the second connector portion.

8. he optical-path turning device according to claim 5, comprising another set of optical waveguides extending from the connection end face of the first connector portion to the connection end face of the third connector portion.

* * * * *